Dec. 7, 1943.  R. S. GAUGLER  2,336,085
REFRIGERATING APPARATUS
Filed June 25, 1941
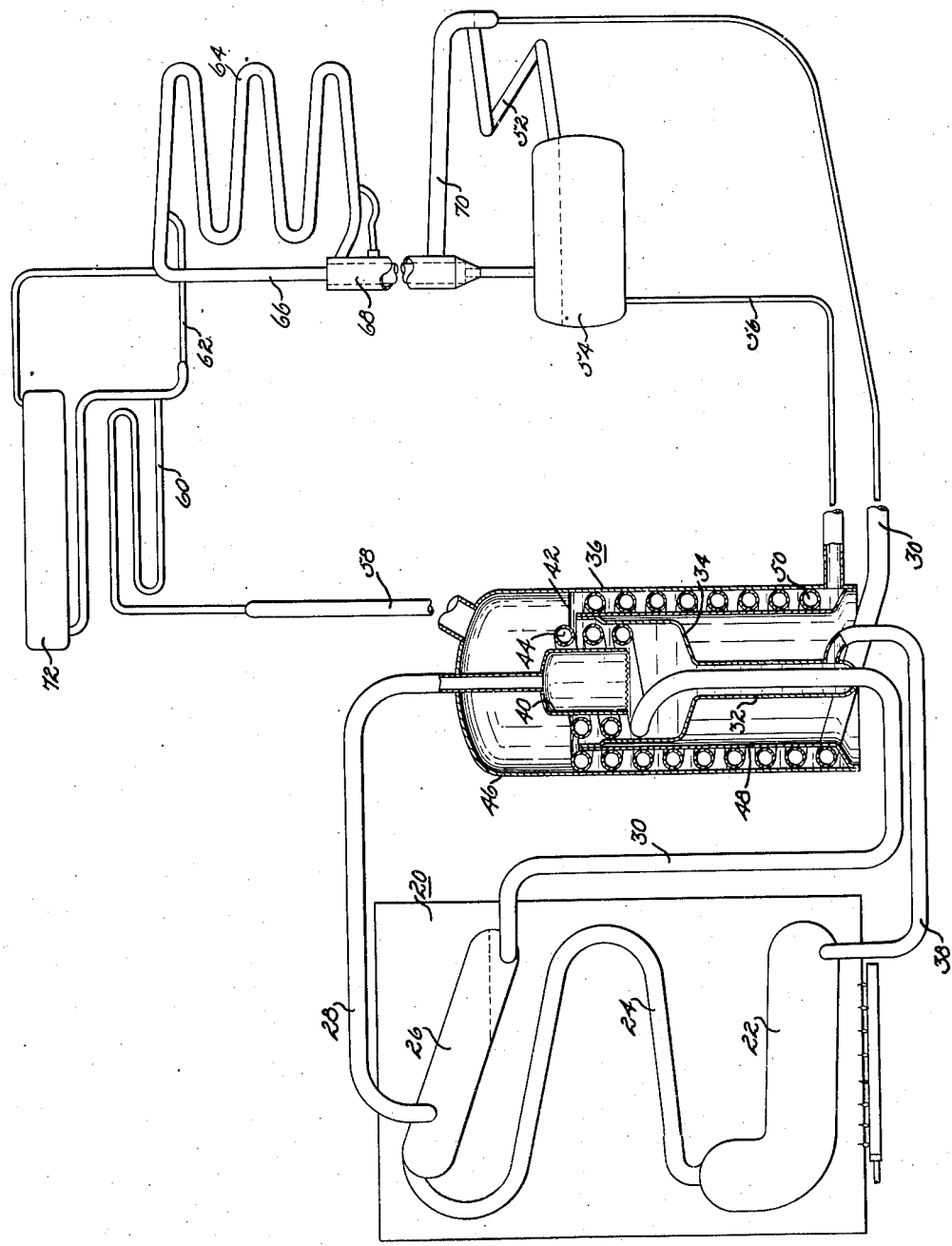

Patented Dec. 7, 1943

2,336,085

UNITED STATES PATENT OFFICE 2,336,085

REFRIGERATING APPARATUS

Richard S. Gaugler, Dayton, Ohio, assignor to General Motors Corporation, Dayton, Ohio, a corporation of Delaware Application June 25, 1941, Serial No. 399,683

7 Claims. (Cl. 62—119.5)

This invention relates to refrigerating apparatus and more particularly to an absorption refrigerating system.

One of the important elements which improves the efficiency of absorption systems is the analyzer in which generator vapors are caused to bubble through a body of rich liquor which is on its way to the generator. Heretofore analyzers have been made of complicated configurations of tubing. Such a construction is not well suited for mass production purposes and requires expensive jigs for manufacture as well as for checking the elevation of different portions thereof. Furthermore in such analyzers the vapor passes through the liquid in large volumes so that the contact between the liquid and the vapor is not very intimate.

It is an object of my invention to provide an analyzer in which a more intimate mixture of hot vapor and rich liquor is attained.

It is another object of my invention to pass the hot vapor in minute bubbles through the rich liquor.

It is another object of my invention to provide an analyzer which is compact, simple, easy to manufacture in large quantities and efficient.

It is another object of my invention to provide a combined analyzer and heat exchanger which is compact, inexpensive to manufacture in large quantities and efficient.

It is another object of my invention to combine the analyzer and heat exchanger in which the vapor generated in the heat exchanger may flow freely to the condenser.

It is still another object of my invention to provide a heat exchanger between the weak and the strong liquor both before and after the analyzer.

To attain these objects I have provided a combined analyzer and heat exchanger comprising an inner cup-shaped member which holds the rich liquor and into which extends an inverted cup-shaped member having a toothed rim considerably below the liquid level so that the vapor is expelled from the serrations in the rim in a plurality of very fine streams to form minute globules which rise in rich liquor and impinge upon a weak liquor coil, which is wound helically between the two cup-shaped members. This causes further contact between the minute globules and the liquid so that the water vapor in the globules is condensed and goes into the liquid while the heat of condensation causes the stripping of some ammonia vapor from the rich liquor. An interchanger surrounds the inner cup-shaped member and is housed within a neat appearing cylindrical member.

Further objects and advantages of the present invention will be apparent from the following description, reference being had to the accompanying drawing, wherein a preferred form of the present invention is clearly shown.

In the drawing:

The figure shows a sectional view of my improved combined analyzer and heat exchanger together with a diagrammatic representation of the remaining elements of a partial pressure type absorption refrigerating system.

In the figure there is shown a generator 20 of the plate type containing a lower chamber 22 from which through a vapor lift action rises aqua ammonia and ammonia vapor which rise through an elevating passage 24 to an inclined upper chamber 26 from the upper end of which the vapor escapes through a conduit 28 and from the lower end of which the weak liquor is drained through a conduit 30. This conduit 30 extends upwardly through a long projection 32 upon the bottom of an inner cup 34 in the combined analyzer and heat exchanger 36. The portion of the tube 30 within the projection 32 provides a heat exchange between the rich liquor flowing downwardly through the projection 32 to the rich liquor supply conduit 38 which connects to the lower chamber 22 of the generator 20.

The vapor from the inclined upper chamber 26 passes through the conduit 28 into the interior of an inverted cup 40 which is immersed to the greater extent below the normal level 42 in the analyzer 36. The rim at the bottom of the inverted cup 40 is provided with a finely toothed edge so that generator vapors discharged into the inverted cup from the vapor conduit 28 will escape in very fine streams from the serrations between each pair of teeth formed on the rim of the inverted cup 40. Between the inverted cup 40 and the inner cup 34 the weak liquor conduit 30 is formed into the coil portion 44. This coil portion 44 substantially fills the space between the two cups so that the streams of vapor issuing from the rim of the inverted cup will impinge this coil portion 44 in their ascent through the rich liquor within the inner cup 34. Through this means the vapor is broken up into minute globules which pass upwardly through the liquid and remove ammonia vapor from the rich liquor while at the same time most of the water vapor is removed from the globules. The resultant vapor is collected in a vapor chamber formed above the liquid level 42 by the closed upper end of the cylinder 46.

The upper rim of the inner cup 34 and the lower rim of the cylinder 46 are joined by a cylinder 48. Between the cylinder 48 and the cylinder 46 there is formed a principal or main heat exchanger by placing a larger and longer coiled portion 50 of the weak liquor conduit 30 in this space. The weak liquor conduit 30 then extends from the bottom of the analyzer and heat exchanger 36 to the upper end of the absorber 52.

The weak liquor becomes enriched as it flows downwardly through the absorber 52 and is collected at the lower end by a receiver 54.

This enriched or rich liquor from the receiver 54 is fed through the conduit 56 to the bottom of the space between the cylinders 46 and 48 so that it will be forced to pass helically upwardly between these two cylinders and between the convolutions of the large helical portion 50 of the weak liquor conduit 38. Thus an excellent form of heat exchanger is provided directly in connection with the analyzer. The rich liquor flows up to the top of the cylinder 48 and then flows over the rim of the inner cup 34 and thence flows downwardly over the surfaces of the coil portion 44 to the bottom of the inner cup 34. The hot weak liquor within the weak liquor conduit 30 drives off ammonia vapor from the rich liquor in both heat exchange portions, namely in the heat exchange portion provided by the projection 32 and the heat exchange portion between the cylinders 46 and 48. This vapor rises from all points through the rich liquor which removes water vapor and replaces the water vapor with ammonia vapor, and this ammonia vapor like that discharged from the inverted cup 40 all accumulates in the upper portion of the combined analyzer and heat exchanger 30 above the liquid level 42. This vapor then rises through the conduit 58 to the condenser 60 where the vapor is condensed and conducted through the conduit 62 to the evaporator 64.

An inert gas, such as hydrogen is provided in the hydrogen circuit which includes the absorber and the evaporator. The hydrogen flows upwardly through the evaporator in the opposite direction to the ammonia liquid and the ammonia liquid evaporates into the hydrogen to provide refrigeration at satisfactory refrigeration temperatures. The hydrogen becomes weighted down with ammonia vapor and flows downwardly through conduit 66 and the gas interchanger 68 to the receiver 54 from which point it rises through the absorber where the ammonia vapor is absorbed and the hydrogen stripped of the ammonia vapor passes upwardly through the conduit 70 and the gas interchanger 68 to the bottom of the evaporator. The hydrogen reservoir 72 is provided at the top of the system so as to raise the total pressure of the system when condenser temperatures are high.

It will be seen that the analyzer and heat exchanger is made from four simply formed sheet metal members, namely the outside cylinder member 46 with the closed upper end, the inner cylinder 48, the inner cup-shaped member 44 and the inverted cup 40, together with a single piece of tubing, namely the weak liquor conduit 30 which is formed into a helically coiled portion 50. The joints required are comparatively simple and the combined analyzer and heat exchanger is efficient, neat and compact as well as inexpensive to manufacture.

While the form of embodiment of the invention as herein disclosed, constitutes a preferred form, it is to be understood that other forms might be adopted, all coming within the scope of the claims which follow.

What is claimed is as follows:

1. An analyzer comprising a container for rich liquor, a first member having its outlet below the normal level of rich liquor in the container, means for introducing vapors from the generator into the interior of said member, and a second member extending substantially helically in the space between said first member and said container, the coils of said second member surrounding said first member and extending substantially across said space surrounding the first member.

2. An analyzer comprising a container for rich liquor, a member having its outlet below the normal level of rich liquor in the container, means for introducing vapors from the generator into the interior of said member, and a conduit for weak liquor extending helically in the space between said member and said container substantially concentric with said outlet.

3. An analyzer comprising a container for rich liquor, a first member having its outlet directed downwardly below the normal level of rich liquor in the container, means for introducing vapors from the generator into the interior of said first member, a second member extending substantially helically in the space between said first member and said container substantially concentric with said outlet, the bottom of the container being provided with an outlet, and means for continuously introducing rich liquor into the upper part of the container.

4. An analyzer comprising a container for rich liquor, means located below the liquid level for separating the major portion of the liquid into substantially separate bodies, a first member having its outlet turned downwardly and located within and beneath the liquid level of one of said substantially separate bodies, a weak liquor conducting member extending first generally helically around said first member at a level above the outlet in said one separate body and then extending through said second body.

5. An analyzer comprising a cover member having a vertical wall, a second member having a vertical wall within said cover member, said vertical walls of said cover and second members being sealed together adjacent their lower edges, a container member sealed to said second member adjacent their upper edges, and a third member having its outlet below the liquid level in the container member.

6. An analyzer comprising a cover member having a vertical wall, a second member having a vertical wall within said cover member, said vertical walls of said cover and second members being sealed together adjacent their lower edges, a container member sealed to said second member adjacent their upper edges, a third member having its outlet below the liquid level in the container member, and conduit extending helically around said third member within said container member.

7. An analyzer comprising a cover member having a vertical wall, a second member having a vertical wall within said cover member, said vertical walls of said cover and second members being sealed together adjacent their lower edges, a container member sealed to said second member adjacent their upper edges, a third member having its outlet below the liquid level in the container member, and conduit extending helically between said cover member and said second member.

RICHARD S. GAUGLER.